(12) United States Patent
Ericson

(10) Patent No.: US 10,430,778 B2
(45) Date of Patent: Oct. 1, 2019

(54) USING AUGMENTED REALITY FOR SECURE TRANSACTIONS

(71) Applicant: PAYPAL, INC., San Jose, CA (US)

(72) Inventor: Braden Christopher Ericson, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 43 days.

(21) Appl. No.: 15/720,067

(22) Filed: Sep. 29, 2017

(65) Prior Publication Data

US 2019/0102767 A1    Apr. 4, 2019

(51) Int. Cl.
*G06Q 20/30* (2012.01)
*G02B 27/01* (2006.01)
*G06T 19/00* (2011.01)

(52) U.S. Cl.
CPC .......... *G06Q 20/30* (2013.01); *G02B 27/017* (2013.01); *G06T 19/006* (2013.01); *G02B 2027/0178* (2013.01)

(58) Field of Classification Search
CPC ............... G06Q 20/30; G02B 27/017; G02B 2027/0178; G06T 19/006
See application file for complete search history.

(56) References Cited

U.S. PATENT DOCUMENTS

| | | | | |
|---|---|---|---|---|
| 2013/0293580 A1* | 11/2013 | Spivack | ............. | G06Q 30/0643 345/633 |
| 2014/0237578 A1* | 8/2014 | Bryant | ................... | G06Q 10/10 726/7 |
| 2015/0095228 A1* | 4/2015 | Su | .......................... | G06O 20/12 705/44 |
| 2016/0125411 A1 | 5/2016 | Briggs et al. | | |
| 2017/0132842 A1 | 5/2017 | Morrison | | |
| 2017/0221247 A1 | 8/2017 | Severn et al. | | |
| 2017/0243434 A1 | 8/2017 | Lyons et al. | | |
| 2017/0256094 A1 | 9/2017 | Aratsu et al. | | |
| 2017/0262833 A1* | 9/2017 | Xing | .................... | G06Q 20/023 |
| 2018/0158053 A1* | 6/2018 | Adams | ................ | G06F 3/04886 |
| 2018/0158060 A1* | 6/2018 | Adams | ................. | G06Q 20/409 |

OTHER PUBLICATIONS

Santosh, "Augmented Reality: Where It Starts", http://electronicsforu.com/market-verticals/consumer/augmented-reality-basics-starts, Jul. 25, 2017, pp. 1-5.
Meghraj Singh Beniwal, "Augmented Reality: How Real is the Interaction", http:electronicsforu.com/technology-trends/augmented-reality-real-interaction, Aug. 1, 2017, pp. 1-7.

\* cited by examiner

*Primary Examiner* — Dmitriy Bolotin
(74) *Attorney, Agent, or Firm* — Haynes and Boone, LLP.

(57) ABSTRACT

A method for using an Augmented Reality (AR) device for processing transactions initiated at another device. The method includes acquiring, via an AR device, an image of a display of a user device. The method includes determining, based on image analysis of the image, that the user device displays an interactive transaction element for a transaction between the user device and a server. The method includes communicating with a server, that provides the interactive transaction element, to move functionality of the interactive transaction element from the user device to the AR device. The method includes generating a new interactive transaction element providing access to the transaction at the server. The method also includes providing access to the new interactive transaction element that is visually projected via the AR device.

20 Claims, 6 Drawing Sheets

USING AUGMENTED REALITY FOR SECURE TRANSACTIONS

BACKGROUND

Embodiments of the inventive subject matter generally relate to the field of augmented reality and, more particularly, to using augmented reality to initiate transactions.

Augmented Reality (AR) is a computer-generated environment that augments user's view of a real-world environment using computer-generated elements, such as sound, video, and/or other sensory outputs. AR can be implemented using computer-generated images that overlay a user-accessed view of a real-world. AR images can be displayed via AR glasses that are worn by the user, and thus can augment the real-world view seen by the user. For example, AR can be used to display supplemental images about certain elements in a field of vision of the AR glasses. The supplemental images are displayed in a way that aligns with real-world elements seen by the user.

A computer system that implements AR can access images of the real-world in the field of vision of the AR glasses. The computer system can then perform image analysis to detect certain elements in the accessed image. Based on element detection, the computer system can determine AR images to superimpose over the accessed image. The AR images can be moved and/or resized as the user moves the AR glasses and/or when the detected elements move, which can be caused by the user walking, user's head movement, movement of the detected elements, and/or via other movements. The user may also access a transaction system, such as a payment system, to conduct one or more transactions using an account of the user. However, the user may not obtain any benefit of using AR devices when accessing such a transaction system.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
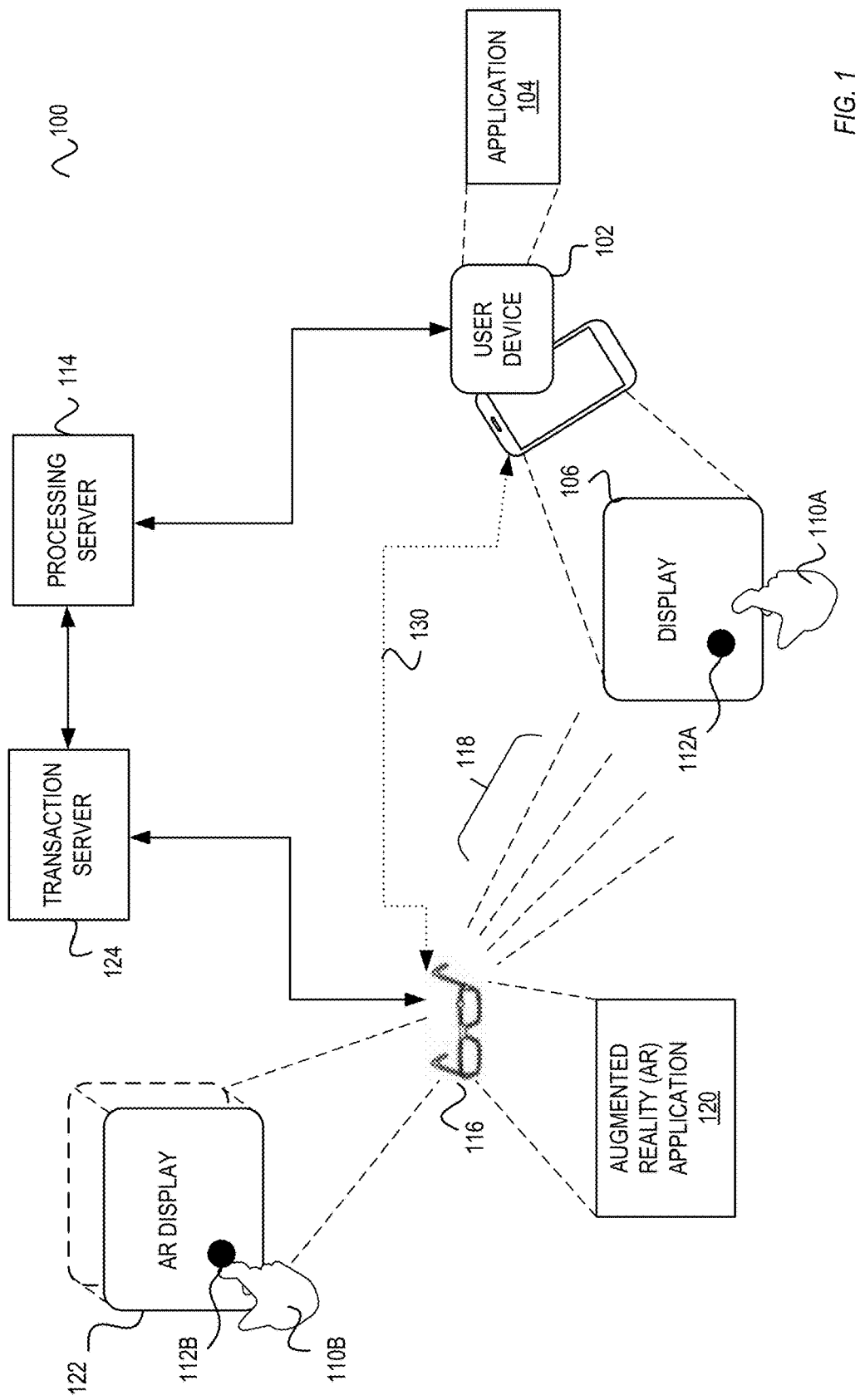
FIG. 1 is a system diagram illustrating embodiments of a system that uses an AR device for securely processing transactions that are initiated at another device.

The description that follows includes exemplary systems, methods, techniques, instruction sequences and computer program products that embody techniques of the present inventive subject matter. However, it is understood that the described embodiments may be practiced without these specific details. For instance, although many examples refer to AR, computer-generated images that simulate a user's physical presence in an imaginary environment can be used instead, such as Virtual Reality (VR). In some embodiments, AR and VR can be used interchangeably. In some embodiments, AR and VR can be used at the same time. In some embodiments, mixed reality (MR) can be used instead, where virtual and real worlds are combined. In MR, immersive environments are created that allow a user to interact with real world environments (such as via user-controlled robots) via real and virtual elements.

A computer device can generate an AR environment by augmenting a user's view of a real-world environment using computer-generated elements, such as by using sound, video, and/or other sensory outputs. An AR device can be implemented using AR glasses or another device that generates images (or accesses generated images) and overlays a user-accessed view of a real-world. AR images can be displayed via AR glasses that are worn by the user, and thus can augment a real-world view seen by the user.

The AR device can determine objects and/or images at which the user is looking. The AR device can use eye-tracking, or another technique, to determine a field-of-view that is viewed by the user of the AR device (also referred to as a "user view") of a real-world. For example, the AR device can have a camera (and/or other optical sensors) that can take videos and/or multiple photos, referred to collectively as image acquisition. The AR device can analyze the acquired images, such as by applying image analysis, to determine content of these images. For example, the AR device (or another device in communication with the AR device) can perform image analysis to detect certain elements in the viewed image(s). The AR device can also determine images and/or elements in these images that are most often viewed by the user.

The user may also access a transaction server to conduct one or more transactions on an account of the user. For example, the transaction server may implement a payment system, and can process a payment transaction that are initiated by the user. The user can use another device, such as a laptop or a mobile device to access the transaction server. For example, the user can use a mobile device to access the transaction server to initiate a payment transaction from the user's account at the transaction server to another server, such as a merchant. The user can also access a processing server, via the mobile device, which can be associated with a merchant, to initiate a transaction with the transaction server. For example, the user can access, via a web browser or an application executing on the mobile device, the processing server. The processing server can communicate with the web browser or application to provide functionality to initiate the transaction. The mobile device can display an interactive transaction element, such as a button or a dialog box, for prompting the user to initiate the transaction.

The user can operate the mobile device while using the AR device. The AR device can acquire an image of the display of the mobile device. The AR device can determine, based on analysis of the image, that the display displays an interactive transaction element for a transaction between the user of the mobile device and a server. The AR device can communicate with the server that provides the interactive transaction element, to move functionality of the interactive transaction element from the mobile device to the AR device. The AR device can then generate a new interactive transaction element providing access to the transaction at the server. The AR device can then provide access to the new interactive transaction element that is visually projected onto certain real-world images seen by the user via the AR device.

Therefore, the methods described herein allow a user to use his or her AR device to securely conduct a transaction that was initiated at a non-secure device. The non-secure device can be a mobile device, a laptop, or another device that is not authenticated to access the user's account at a server. Instead of authenticating for the transaction via the non-secure device via a displayed interactive element, the user can use the AR device to acquire an image from a display of the non-secure device. The AR device can perform image analysis on the image to determine that the image includes the interactive element, such as a checkout button, for the transaction. The AR device can access the transaction at the server to provide authenticated access to the transaction to the user via the AR device. The AR device can determine to display, via a AR display, a new interactive element referencing the transaction. The AR device can determine to display the new interactive element based on a geographical location of the user, as well as on the user's view via the AR device. The following description, and associated Figures, illustrates various embodiments directed to the ideas listed above.

FIG. 1 is a system diagram illustrating embodiments of a system that uses an AR device for securely processing transactions that are initiated at another device. In an overview of a system diagram 100, a user device 102 includes a display 106. The user device also hosts an application 104 that provides elements (e.g., an interactive transaction element 112A) to the display 106 for displaying. The application 104 can receive user input via the display 108. The application can communicate with a processing server 114.

In some embodiments, the user device 102 can communicate with the processing server 114 to initiate a transaction. For example, the processing server 114 can communicate with the user device 102 to display, on the display 106, images of products and/or services that can be purchased by the user. The user can access the processing server 114, as via the application 104 that can be a stand-alone application or client functionality accessed via a web browser, to initiate a transaction. The transaction can be for purchase of a product and/or service that is offered by the processing server 114 (e.g., a merchant or a service provider). The transaction can be for a transfer of funds between a user account at the transaction server 124 and another account (such as at the transaction server 124 or at another system). The transaction can be for initiating a software service (e.g., a software-as-a-service (SaaS)) that is provided to the user device 102 by the processing server 114. The transaction server 124 can provide authentication of the user device 102 (and/or of the user) to the processing server 114 to process the transaction. The processing server 114 may require the authentication from the transaction server 124 prior to processing of the transaction.

The AR application 120 can also be any type of an application that requires an acknowledgement and/or authorization from the user. The AR application 120 can be a payment application that requires authorization from the user to confirm a payment transaction. The AR application 120 can be a stand-alone application, or a client functionality accessed via a web browser. The AR application 120 can be also used to authenticate the user to access the user account at the transaction server 124. The user can interact with the AR application 120 via the AR display 122, such as via the new interactive transaction element 112B. The AR application 120 can also perform image analysis on acquired images, such as to determine whether the images include representations of certain elements. The AR application 120 can also perform image analysis to determine whether a scene image (of the acquired image) matches certain predetermined scenes.

In some embodiments, AR device 116 can receive a user selection 110B by tracking user gestures. For example, the AR device 116 can use cameras to track location and movement of user's arm, hand, and/or fingers to determine whether the user selects the new interactive transaction element 112B. The AR device 116 can receive the user selection 110B based on user's gestures as determined by the cameras. In some embodiments, the AR device 116 can use motion detection sensors such as infrared sensors and/or photodetectors to detect hand motions and/or gestures. The AR device 116 can track the movement of user's hand via tracking gloves worn by the user, where the tracking gloves can include sensors that detect user's hand and/or finger movements. The AR device 116 can receive the user selection 110B based on position and/or signals received from a pointing device held by the user. The AR device 116 can provide haptic feedback to the user to indicate that the user selection 110B has been received.

The processing server 114 can be associated with a merchant/or a service provider and the transaction server 124 is associated with a payment system. In this case, the processing server 114 can receive a request from the user device 102 (e.g., via the application 104) for initiation of a transaction, for purchase of a product and/or service, at the processing server 114. In response to receiving the request, the processing server 114 can communicate with the transaction server 124 to determine whether the user is authenticated for the transaction and/or for initiating a payment for the purchase.

In some embodiments, in response to receiving the request, the processing server 114 can request an interactive transaction element from the transaction server 124. The interactive transaction element can be communicated by the transaction server 124 to the processing server 114 using indicator code. The indicator code can be a snippet of code, an applet, an executable, a control, and/or a plug-in, among others. In one embodiment, instead of the indicator code, the transaction server 124 can communicate instructions to the processing server 114 for presenting the interactive transaction element to the user device 102 for display at the display 106. The instructions can be implemented as a function call, a call-back, a web-hook, and/or a command. Upon receiving the indicator code (or the instructions), the processing server 114 can communicate the indicator code (or the instructions) to the user device 102.

In some implementations, a single server (not shown) can implement functionality of both the transaction server 124 and the processing server 114. In this implementation, the single server can communicate with the user device 102 directly. Thus, the single server can transmit the indicator code or instructions to the user device 102. In either server implementation, upon receiving the indicator code (or the instructions), the user device 102 can generate the interactive transaction element, and display this element on the display 106 as a check-out button, a dialog box, or a control element.

The user can interact with the interactive transaction element 112A via a user input, such as a user touch selection at 110A of the interactive transaction element 112A on a touch-screen display implementation of the display 106. The user can select (via the 110A) the interactive transaction element 112A to initiate the transaction with the processing server 114 (or with the single server, depending on the implementation). If the user is authenticated, the processing server 114 can start processing the transaction upon receiving an authentication indication from the transaction server 124. If the user is not authenticated, the transaction server 124 can start an authentication process prior to communicating the authentication indication to the processing server for starting the transaction processing.

The AR device 116 can be worn and/or accessed by the user. As discussed above, the AR device 116 can be implemented using AR glasses or another device that overlays AR elements on the field-of-view (also referred to as a "user view") of a real-world as viewed by the user via the AR device 116. AR elements can be visual elements that can be generated by the AR device 116, or are received from another device or server. AR elements can be displayed by the AR device 116 on the user view to augment the real-world view seen by the user using the AR device 116. The AR device 116 can acquire an image of the display 106. For example, the AR device 116 can include cameras or other optical sensors, which can be used to acquire (shown as 118 in FIG. 1) the image. The AR application 120 can then analyze the acquired image, and based on analysis of the image, detect a representation of the interactive transaction element 112A in the acquired image. The AR application 120 can thus determine, based on the image analysis, whether the display 106 of user device 102 displays the interactive transaction element 112A.

The AR application 120 can transmit a move request to the transaction server 124 (or with the single server) for moving functionality of the interactive transaction element 112A from the user device 102 to the AR device 116. Upon receiving the move request from the AR device 116, the transaction server 124 can communicate the indicator code (or instructions) to the AR device 116 for displaying the interactive transaction element on an AR display 122. Upon receiving the move communication from the AR device 116, the transaction server 124 can also communicate (e.g., via the processing server 114) remove instructions to the user device 102 for removing the functionality of the interactive transaction element from application 104. The remove instructions can also instruct the application 104 to remove the interactive transaction element from being displayed on the display 106.

Figure 3:
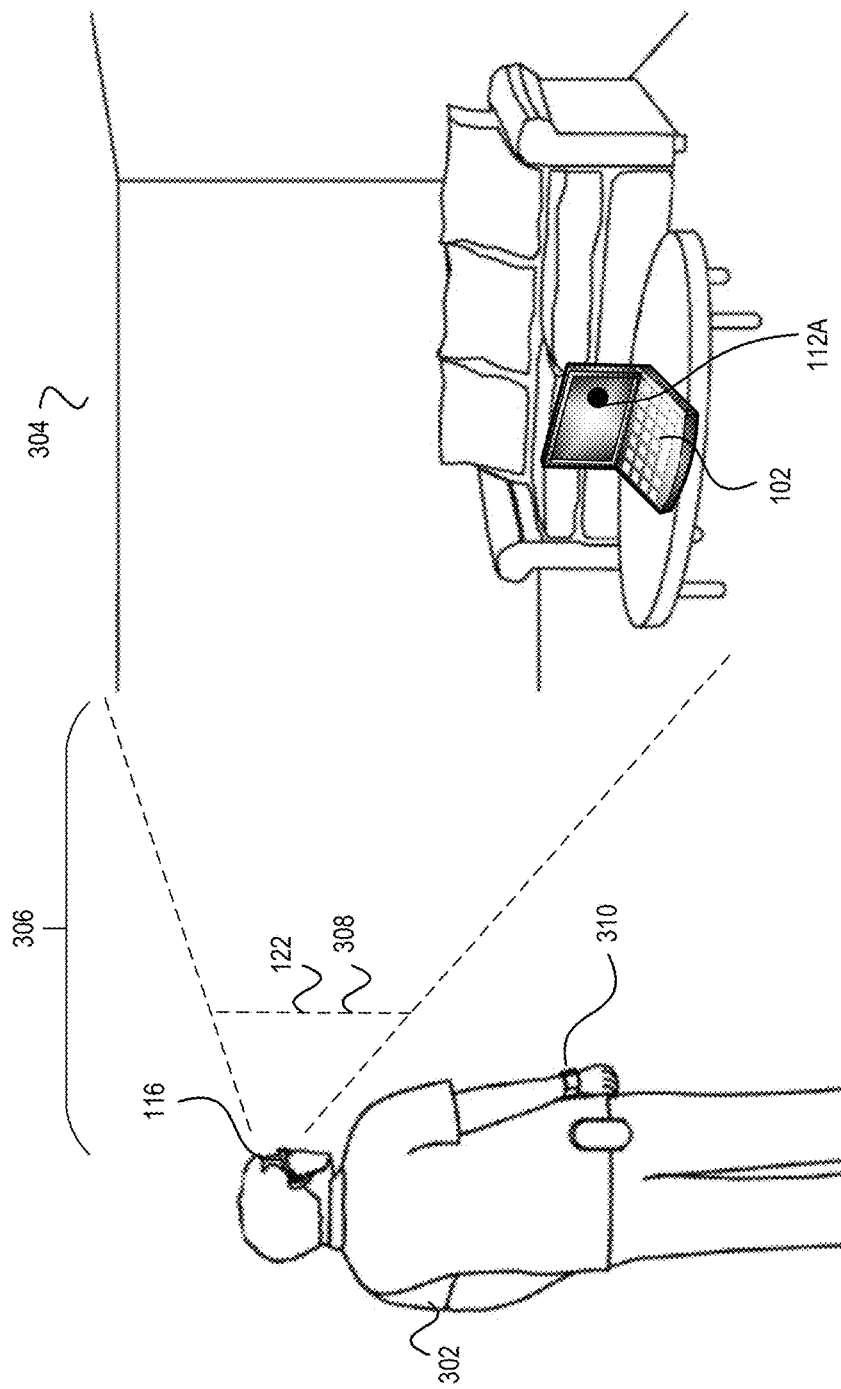
FIG. 3 is a diagram illustrating embodiments of using an AR device to access transactions initiated at another device.

The AR application 120 can, responsive to receiving the indicator code or instructions from the transaction server 124, display the interactive transaction element 112B on the AR display 122 at a custom location of a scene that is visually accessible via the AR device 116. The AR application 120 can determine the custom location based on a visual scene that is accessible, by the user, via the AR device 116, as well as based on a user configuration. The user configuration can indicate several locations of one or more scenes accessible via the AR device 116 where the AR device 116 can superimpose the interactive transaction element 112B. FIGS. 3 and 4 illustrate embodiments of how AR device 116 can superimpose the interactive transaction element 112B.

The application 104 can be any type of an application that requires an acknowledgement and/or authorization from the user. The application 104 can be a payment application that requires authorization from the user to confirm a payment transaction. The application 104 can be a stand-alone application, or a client functionality accessed via a web browser. The application 104 can be also used to authenticate the user to access the user account at the transaction server 124. The user can interact with the application 104 via the display 106, such as via the interactive transaction element 112A.

In some embodiments, the user device 102 and the AR device 116 are the same device (referred to herein as a "single device"), such as a mobile phone. The single device can host both the application 104 and the AR application 120. The single device can also provide access to the display 106, as well as to the AR display 122. Similarly as discussed above, the application 104 can require authorization from the user to confirm a transaction being initiated at the processing server. The AR application 120 can receive a transaction signal indicating the transaction at the application 104. The transaction signal can be received from an operating system on the single device, from the user, or a notification from the application 104. The AR application 120 can access a screenshot of the application 104 as the image that includes the interactive transaction element. The AR application can then perform the image analysis on the image to detect the interactive transaction element and to determine the transaction reference. Similarly as discussed above, the AR application 120 can then generate the new transaction element that is displayed via the AR display 122. The discussion below also applies to the single device embodiments, with the noted changes to how the images are acquired.

Figure 2:
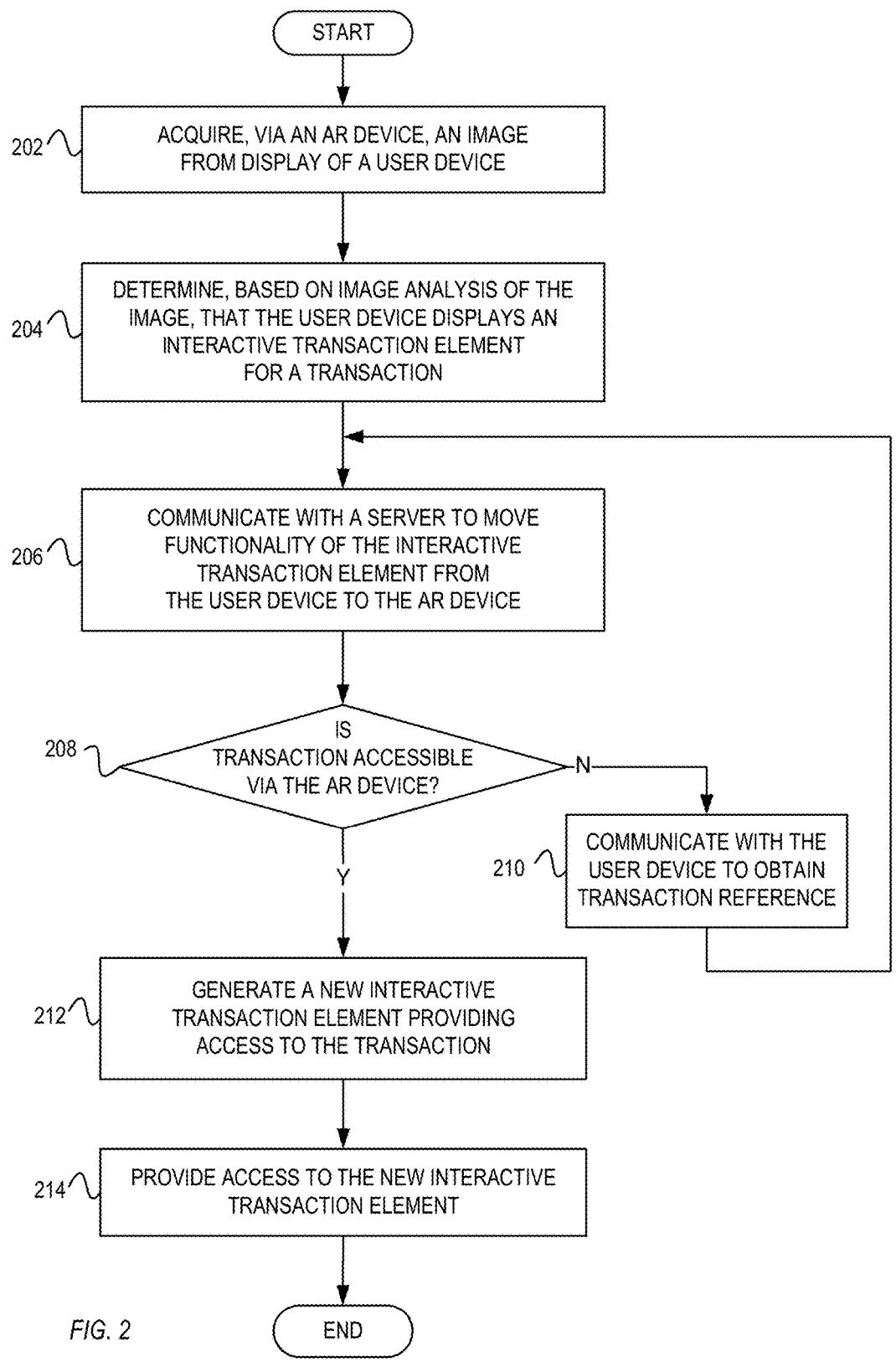
FIG. 2 is a flow diagram illustrating embodiments of operations for using AR for secure transactions.

FIG. 2 is a flow diagram illustrating embodiments of operations for using AR for secure transactions. The method of FIG. 2 is described with reference to the systems and components described in FIG. 1 (for illustration purposes and not as a limitation). The example operations can be carried out by the AR application 120.

Beginning with 202, the application acquires, via an AR device, an image of display of a user device. With reference to FIG. 1, the AR application 120 can acquire the image of the display 106 of the user device 102. The AR application 120 can obtain the image from camera(s) and/or other sensors of the AR device 116.

At 204, the application determines, based on image analysis of the image, that the user device displays an interactive transaction element for a transaction. With reference to FIG. 1, the AR application 120 can analyze the acquired image and, based on this image analysis, determine that the user device 102 displays (e.g., via the display 102) the interactive transaction element 112A. In some embodiments, the AR application 120 can, based on image analysis, obtain a transaction reference for the transaction.

The AR application 120 can determine that the interactive transaction element 112A includes an embedded identifier that can be used as the transaction reference. For example, the interactive transaction element 112A can include a QR code that is embedded around the interactive transaction element 112A or inside a portion of the interactive transaction element 112A. In other implementations, the interactive transaction element 112A can include the identifier that is embedded or otherwise obscured. For example, the interactive transaction element 112A can include the identifier that is implemented using a SnapTag, a 2-dimensional bar code, and/or a SPARQCode, among others.

At 206, the application communicates with a server to move functionality of the interactive transaction element 112A from the user device 102 to the visual I/O device. With reference to FIG. 1, the AR application 120 can communicate a move request to the transaction server 124 for moving the functionality of the interactive transaction element 112A from the user device 102 (including from the display 106) to the AR device 116 (including to the AR display 122).

At 208, the application determines whether the transaction is accessible via the visual I/O device. With reference to FIG. 1, the AR application 120 determines whether the transaction referenced by the interactive transaction element 112A is accessible at the transaction server 124. In some embodiments, the transaction is accessible if the AR application 120 can obtain a transaction reference that allows the AR application 120 to access the transaction at the transaction server 124. In some embodiments, the transaction is accessible if the AR application 120 is authenticated to access the transaction at the transaction server 124. If the application determines that the transaction is accessible, flow continues at 212. Otherwise, flow continues at 210. At 210, the application communicates with the user device to obtain transaction reference. The AR application 120 can communicate with the user device 102, over the communication link 130, to obtain the transaction reference for the transaction referenced at 204. The AR application 120 can then access the transaction at the transaction server 124 using the transaction reference. After 210, the flow continues at 206.

At 212, the application generates a new interactive transaction element providing access to the transaction. With reference to FIG. 1, the AR application 120 generates the new interactive transaction element 112B that provides access to the transaction at the transaction server 124. The AR application 120 can generate the new interactive transaction element 112B at a custom location of a user view of the user. The user view can be the user-accessed view of the real-world, as seen by the user via the AR device. The custom location can be determined based on the user view and/or user preferences.

The AR application 120 can determine the custom location of the new interactive transaction element 112B based on a geographical location of the AR device 116. The AR application 120 can determine whether the AR device 116 is physically located at, or near, one of pre-defined geographical locations (e.g., as defined by user preferences). The AR application 120 can then display the new interactive transaction element 112B anywhere on scene images acquired at the geographical location. For example, the AR application 120 can determine that the AR device is located at a geographical location of the user's home which is one of the pre-defined locations. The AR application 120 can then display the new interactive transaction element 112B on any scene image acquired by the AR device 116 at the user's home.

The AR application 120 can determine the custom location of the new interactive transaction element 112B based on whether a scene image acquired by the AR device 116 matches a pre-determined scene. The AR application 120 can analyze the scene image acquired by the AR device 116. In some embodiments, the AR application 120 can continuously analyze scene images acquired by the AR device 116 for matches. In some embodiments, the AR application can analyze scene images acquired by the AR device 116 only at certain geographical locations, or a certain type of locations, such as only at coffee houses. The AR application can display the new interactive transaction element 112B only to augment certain locations of scene images. For example, the AR application can determine that the new interactive transaction element can only be superimposed at a certain area of a table of a scene image acquired at a certain coffee house. FIGS. 3 and 4 illustrate embodiments of how AR device 116 can superimpose the interactive transaction element 112B.

In some embodiments, after generating the new interactive transaction element 112B, the AR application 120 determines whether the interactive transaction element 112A is removed from the image displayed by the display 106. The AR application 120 can thus perform additional image analysis on additional acquired images of the display 106 of the user device 102. The AR application 120 can perform 214 in response to determining that the interactive transaction element 112A is removed from the image. If the interactive transaction element 112A is not removed from the image, the AR application 120 can communicate directly with the user device 102, e.g., via a direct communication link 130, with a request to remove the interactive transaction element 112A from the image.

At 214, the application provides access to the new interactive transaction element. With reference to FIG. 1, the AR application 120 can provide access to the new interactive transaction element 112B on the AR display 122. The user can interact with the interactive transaction element 112B via a user input, such as via the user selection 110B.

The AR application 120 can access the user selection 110B of the new interactive transaction element 112B. The AR application 120 can determine that the user selection 110B indicates a confirmation of the transaction by the user, and then transfer control (e.g., ability to initiate processing) of the transaction to the user device 102. Thus, the user can complete the transaction via the user device 102 (e.g., via the application 104) after the transaction is confirmed via the AR device 116. The transaction server 124 can also communicate with the processing server that the transaction is confirmed and will be completed via the user device 102.

The AR application 120 can determine that the user selection 110B indicates an authentication of the user, and then communicate an indication of the user authentication to the transaction server 124. The user can then complete the transaction via the AR device 116 (e.g., via the AR application 120). The transaction server 124 can also communicate an indication of the user authentication to the processing server 114, such that the user can complete the transaction via the user device 102 (e.g., via the application 104).

FIG. 3 is a diagram illustrating embodiments of using an AR device to access transactions initiated at another device. FIG. 3 illustrates how the AR device 116 is used by the user 302 to view a real-world scene 304 of physical surroundings of the user 302. The AR device 116 provides the user 302 a user view 306 of the real-world scene 304, as well as the AR display 122. The AR device 116 can overlay digital images and elements on the AR display 122, such that they appear, to the user 302, a part of the real-world scene 304 when viewed via the user view 306.

The AR device 116 can acquire an image 308 of the real world scene 304. In some embodiments, the AR device 116 can acquire the image 308 such that it coincides with the user view 306. In some embodiments, the AR device 116 can determine to acquire the image 308 that is a different size from that of the user view 306. The acquired image 308 may include digital representations of the real-world scene 304, including a digital representation of the user device 102. The AR device 116 (or another device in communication with the AR device 116) can perform image analysis on the acquired image 308 to determine that the user device 102 includes the interactive transaction element 112A.

Figure 4B:
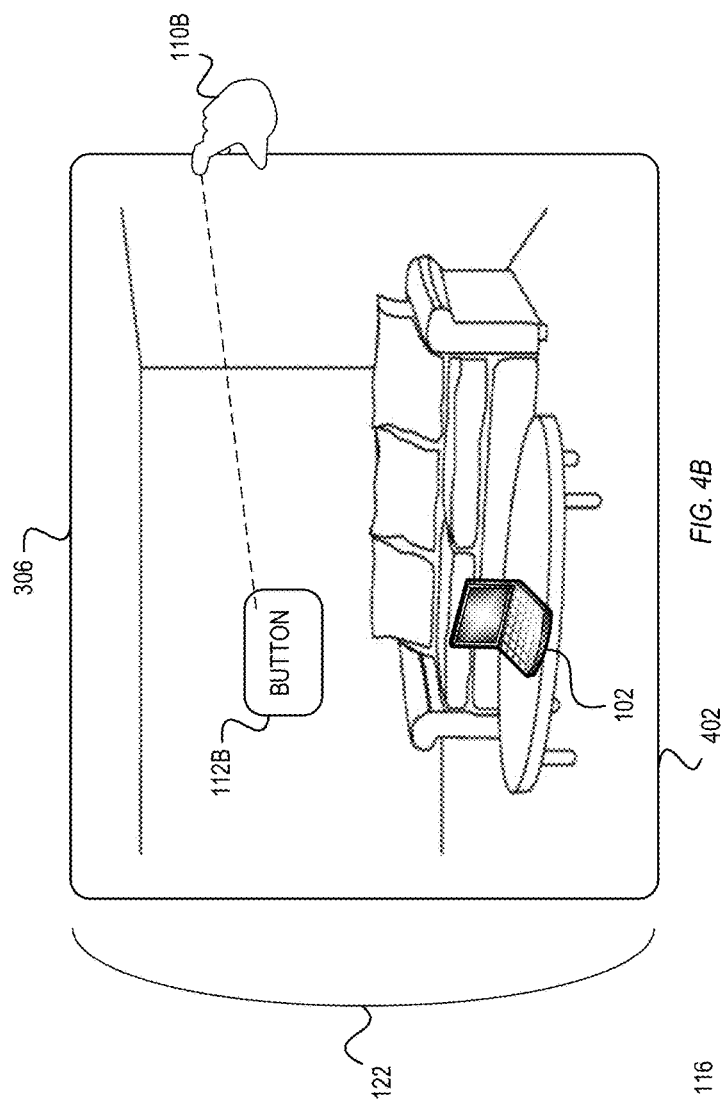
FIGS. 4A and 4B are diagrams illustrating embodiments of a display shown by an AR device when implementing AR for secure transactions.
Figure 4A:
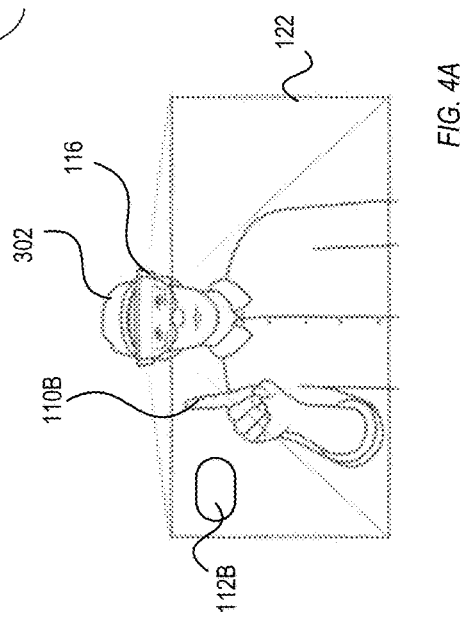

FIGS. 4A and 4B are diagrams illustrating embodiments of a display shown by an AR device when implementing AR for secure transactions. FIG. 4A illustrates the AR display 122 as seen by the user 302 via the AR device 116. The user can see the user view 306 (as shown in FIG. 4B) via the AR display 122. The AR device 116 also displays the generated interactive transaction element 112B. The AR device 116 can detect the user selection 110B, which can indicate a user selection of the generated interactive transaction element 112B. As discussed above, the AR device 116 can detect the user selection 110B via a variety of methods, including by tracking of user 302 gestures, detecting hand motion of the user 302, and/or receiving signals from a pointing device 310 held by the user 302.

FIG. 4B illustrates another view of how the user 302 sees the AR display 122 via the AR device 116. The user 302 can see the user view 306 of a real world scene as well as elements superimposed by the AR device 116. As shown in FIG. 4B, the AR device 116 can overlay, using the AR display 122, the interactive transaction element 112B over the user view 306. The AR device 116 can detect that the user selection 110B of the interactive transaction element 112B.

The AR device 116 can acquire another image 402 of the real-world scene shown in FIG. 4B. The AR device 1156 can perform image analysis of the acquired image 402 to determine that the user device 102 has removed the interactive transaction element 112A from the display 106. It is noted that in some cases, the AR device 116 may not display the generated interactive transaction element 112B if the AR device 116 determines that the acquired image 402 does not match a pre-defined scene.

Figure 5:
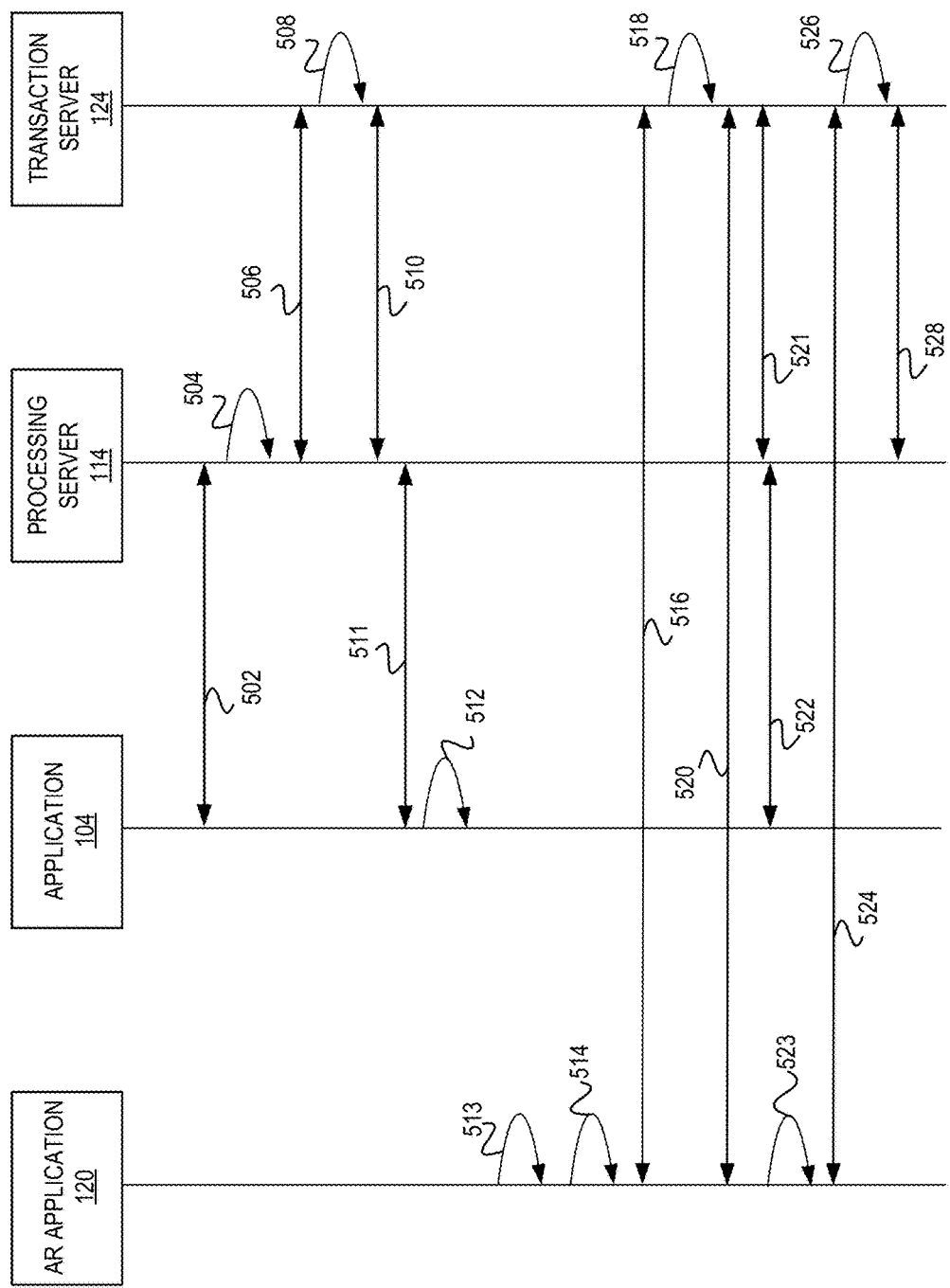
FIG. 5 is a timing diagram illustrating operations for using AR for secure transactions, according to some embodiments.

FIG. 5 is a timing diagram illustrating operations for using AR for secure transactions, according to some embodiments. As shown by FIG. 5, the AR application 120 communicates with the transaction server 124. The application 104 communicates with the processing server 114. The processing server 114 also communicates with the transaction server 124. The communications of FIG. 5 can be performed over one or more communication networks. Portions of the timing diagram of FIG. 5 correspond to the flow diagram of FIG. 2.

At 502, the application 104 communicates with the processing server 114. The application 104 can transmit a transaction request, such as to initiate a transaction. For example, the application 104 can access the processing server 114 to initiate a service request at the processing server 114 (which can implement a service server). At 504, the processing server 114 can determine how to process the transaction. At 506, the processing server 114 can communicate with the transaction server 124, such as to request an interactive transaction element.

At 506, the processing server 114 can communicate with the transaction server 124 to determine whether the application 104 and/or the user is authenticated for the transaction at the transaction server 124. In the transaction flow shown by FIG. 5, the processing server 114 requires authentication of the application 104 and/or the user prior to processing the requested transaction. At 508, the transaction server 124 can determine whether the user application 104 and/or the user is authenticated for the requested transaction. At 508, the transaction server 124 can also determine whether to communicate the interactive transaction element to the processing server 114.

At 510, the transaction server 124 can communicate the interactive transaction element to the processing server 114 using indicator code or instructions. At 511, the processing server 114 can communicate the indicator code or instructions to the application 104. At 512, the application 104 can display the interactive transaction element on the display 106. At 513, the AR application 120 can acquire an image of the display 106. At 514, the AR application 120 can perform image analysis on the acquired image to determine that the display 106 displays the interactive transaction element.

In some embodiments, at 516, the AR application 120 can communicate (e.g., via move instructions) with the transaction server 124 to move the functionality of the interactive transaction element from the application 104 to the AR application 120. At 518, the AR application 120 can determine to provide a new interactive transaction element to the AR application 120, and optionally to remove the interactive transaction element functionality from the application 104. At 520, the transaction server 124 can communicate indicator code or instructions for the new interactive transaction element to the AR application 120. At 521, the transaction server 124 can communicate with the processing server 114 to remove and/or de-activate functionality of the interactive transaction element from the application 104. At 522, the processing server 114 can communicate with the application 104 to remove and/or de-activate functionality of the interactive transaction element.

Alternatively, the processing server 114 can de-activate functionality of the interactive transaction element without communicating with the application 104. Thus, the de-activation is local to the processing server 114, and that the user selection 110A received from the application 104 by the processing server 114 can be ignored (e.g., with regard to initiating processing of the transaction). In this implementation, the processing server 114 can wait on receiving communication from the AR application 120 (e.g., via the transaction server 124) prior to initiating processing of the transaction.

In other embodiments, the AR application 120 can generate the new interactive transaction element offline, e.g., without step 516. Thus, the AR application 120, after determining that the display 106 displays the interactive transaction element, can generate the interactive transaction element without communicating with the transaction server 124. In this implementation, the AR application 120 can obtain information necessary for generation of the new interactive transaction element from the image analysis at 514. For example, the AR application 120 can determine a transaction reference based on the image analysis, and customer ID based on association of the AR device with the user. In another implementation, the AR application 20 can communicate with the application (e.g., via the communication link 130) to obtain the transaction reference. Thus, the steps 516-522 are omitted.

At 523, the AR application 120 can receive user selection of the new interactive transaction element. At 524, the AR application 120 can communicate, to the transaction server 124, indication of the user selection of the new interactive transaction element. At 526, the AR application 120 can authenticate the user and/or the AR application 120 for the transaction. At 526, the transaction server 124 can communicate with the processing server 114 to indicate that the user and/or the user device is authenticated for the transaction.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 1-5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
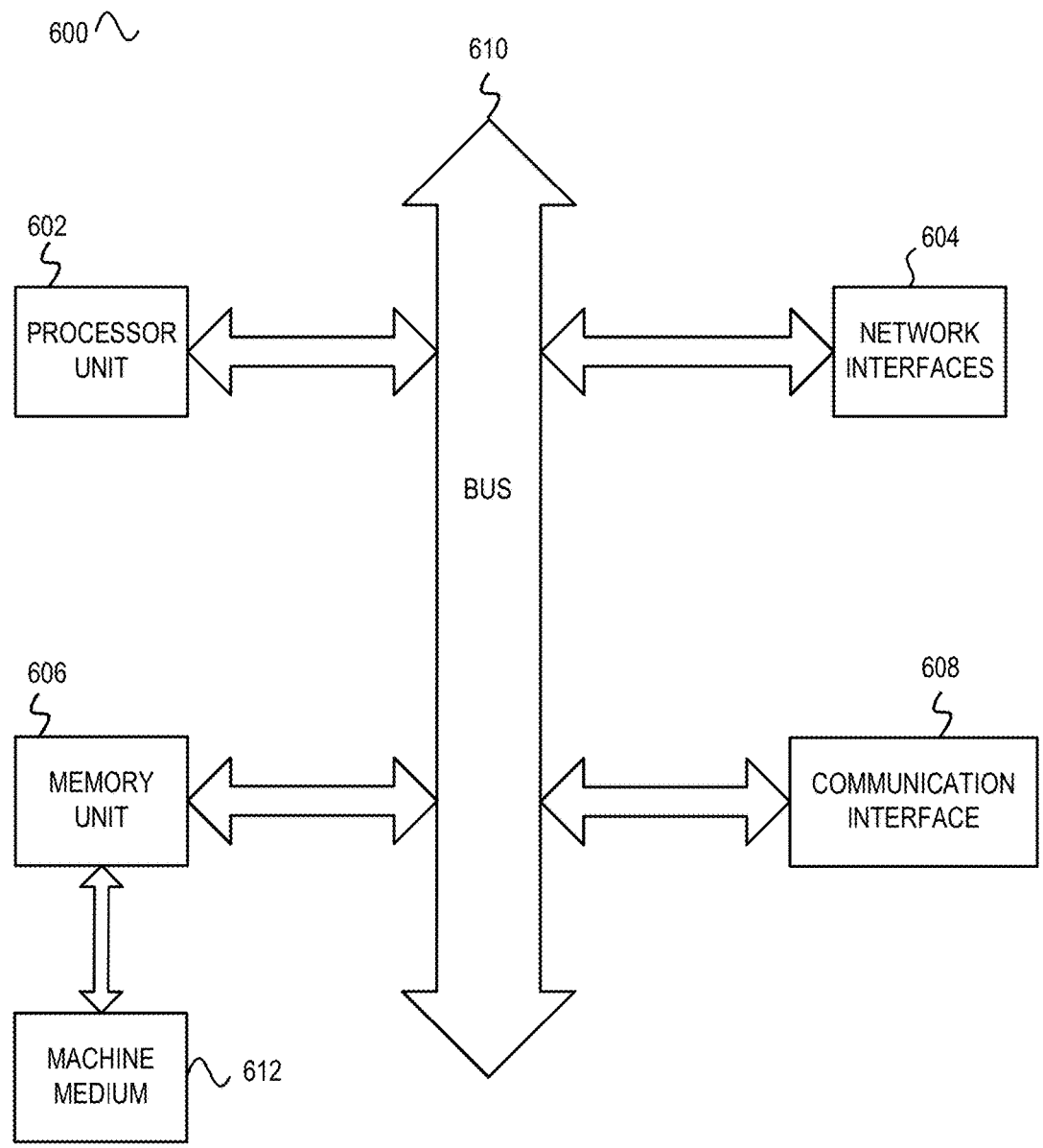
FIG. 6 is a block diagram of embodiments of devices discussed with reference to FIGS. 1-5.

FIG. 6 is a block diagram of an exemplary embodiment of an electronic device 600 including a communication interface 608 for network communications. The electronic device can embody functionality to implement embodiments described in FIGS. 1-5 above. In some implementations, the electronic device 600 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.). The electronic device 600 can also include a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include the bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The communication interface 608 can include at least one of a wireless network interface (e.g., a WLAN interface, a Bluetooth interface, a WiMAX interface, a ZigBee interface, a Wireless USB interface, etc.), In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities that implements using an AR device for securely processing transactions that are initiated at another device. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, the network interface 604 and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for using an AR device for securely processing transactions that are initiated at another device as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for accessing transactions via augmented reality devices, the method comprising:
   acquiring, via an augmented reality (AR) device, an image of a display of a user device;
   determining, based on image analysis of the image, that the user device displays an interactive transaction element for a transaction between the user device and a server;
   communicating with a server to move functionality of the interactive transaction element from the user device to the AR device;
   generating a new interactive transaction element providing access to the transaction at the server;
   visually projecting the new interactive transaction element using the AR device; and
   providing access to the new interactive transaction element that is visually projected via the AR device.

2. The method of claim 1, further comprising:
   after generating the new interactive transaction element, determining whether the interactive transaction element is has been removed from the image;
   wherein said providing access to a new interactive transaction element is performed in response to determining that the interactive transaction element is has been removed from the image.

3. The method of claim 1, further comprising determining a custom location of the new interactive transaction element based, at least in part, on a geographical location of the AR device.

4. The method of claim 3, further comprising:
   determining whether a scene image acquired by the AR device matches a pre-determined scene; and
   in response to a determination that the scene image matches the pre-determined scene, displaying the new interactive transaction element at the scene image, wherein the new interactive transaction element is superimposed at the custom location of the scene image.

5. The method of claim 1, wherein said communicating with the server comprises:
   determining whether the transaction is accessible from the server;
   in response to determining that the transaction is not accessible, communicating with the user device to determine a transaction reference of the transaction; and
   communicating with the server using the transaction reference for moving the functionality of the interactive transaction element.

6. The method of claim 1, wherein the new interactive transaction element is superimposed at a location of a visual scene accessed by the AR device.

7. The method of claim 1, further comprising:
   accessing a selection of the new interactive transaction element;
   determining the selection as a confirmation of the transaction by the user; and
   transferring a control of the transaction to the user device.

8. The method of claim 1, further comprising:
   accessing a selection of the new interactive transaction element;
   determining the selection as an authentication of the user; and
   communicating the authentication of the user to the server.

9. The method of claim 1,
   wherein the server comprises a processing server and a transaction server;
   wherein the transaction server provides the interactive transaction element that is not authenticated at the user device to initiate the transaction; and
   wherein said communicating comprises communicating with the processing server for said generating the new interactive transaction element that is authenticated at the AR device to initiate the transaction.

10. The method of claim 1,
    wherein the server provides the interactive transaction element; and
    wherein said determining that the image comprises the interactive transaction element comprises:
       communicating with the server to confirm the transaction is being processed at the server.

11. A system comprising:
    a non-transitory memory storing instructions; and
    a processor configured to execute the instructions to cause the system to perform operations comprising:
       acquiring, via an augmented reality (AR) device, an image of a display of a user device;
       determining, based on image analysis of the image, that the user device displays an interactive transaction element for a transaction between the user device and a server;
       communicating with a server to move functionality of the interactive transaction element from the user device to the AR device;
       generating a new interactive transaction element providing access to the transaction at the server;

visually projecting the new interactive transaction element using the AR device; and providing access to the new interactive transaction element that is visually projected via the AR device.

12. The system of claim 11, wherein the operations further comprise:

after generating the new interactive transaction element, determining whether the interactive transaction element is has been removed from the image;

wherein said providing access to a new interactive transaction element is performed in response to determining that the interactive transaction element has been removed from the image.

13. The system of claim 11, wherein the operations further comprise:

determining a custom location of the new interactive transaction element based, at least in part, on a geographical location of the AR device.

14. The system of claim 13, wherein the operations further comprise:

determining whether a scene image acquired by the AR device matches a pre-determined scene; and in response to a determination that the scene image matches the pre-determined scene, displaying the new interactive transaction element at the scene image, wherein the new interactive transaction element is superimposed at the custom location of the scene image.

15. The system of claim 11, wherein the communicating with the server comprises:

determining whether the transaction is accessible from the server;

in response to determining that the transaction is not accessible, communicating with the user device to determine a transaction reference of the transaction; and communicating with the server using the transaction reference for moving the functionality of the interactive transaction element.

16. A non-transitory machine-readable medium having instructions stored thereon, the instructions executable to cause performance of operations comprising:

acquiring, via an augmented reality (AR) device, an image of a display of a user device;

determining, based on image analysis of the image, that the user device displays an interactive transaction element for a transaction between the user device and a server;

communicating with a server, that provides the interactive transaction element, to move functionality of the interactive transaction element from the user device to the AR device;

generating a new interactive transaction element providing access to the transaction at the server;

visually projecting the new interactive transaction element using the AR device; and providing access to the new interactive transaction element that is visually projected via the AR device.

17. The non-transitory machine-readable medium of claim 16, wherein the operations further comprise:

after generating the new interactive transaction element, determining whether the interactive transaction element has been removed from the image;

wherein said providing access to a new interactive transaction element visible via the AR device is performed in response to determining that the interactive transaction element has been removed from the image.

18. The non-transitory machine-readable medium of claim 17, wherein the operations further comprise:

determining whether a scene image acquired by the AR device matches a pre-determined scene; and in response to a determination that the scene image matches the pre-determined scene, displaying the new interactive transaction element at the scene image, wherein the new interactive transaction element is superimposed at the custom location of the scene image.

19. The non-transitory machine-readable medium of claim 16, wherein the operations further comprise:

determining a custom location of the new interactive transaction element based, at least in part, on a geographical location of the AR device.

20. The non-transitory machine-readable medium of claim 16, wherein said communicating with the server comprises:

determining whether the transaction is accessible from the server;

in response to determining that the transaction is not accessible, communicating with the user device to determine a transaction reference of the transaction; and communicating with the server using the transaction reference for moving the functionality of the interactive transaction element.

* * * * *

UNITED STATES PATENT AND TRADEMARK OFFICE
CERTIFICATE OF CORRECTION

| | | |
|---|---|---|
| PATENT NO. | : 10,430,778 B2 | Page 1 of 1 |
| APPLICATION NO. | : 15/720067 | |
| DATED | : October 1, 2019 | |
| INVENTOR(S) | : Braden Christopher Ericson | |

It is certified that error appears in the above-identified patent and that said Letters Patent is hereby corrected as shown below:

In the Claims

In Column 13, Line 62, change "is has been" to --has been--

Signed and Sealed this
Twenty-fourth Day of November, 2020

Andrei Iancu
*Director of the United States Patent and Trademark Office*